United States Patent [19]
Kondo

[11] 4,060,313
[45] Nov. 29, 1977

[54] ELECTROMAGNETICALLY DRIVEN OPTICAL BLADE

[75] Inventor: Toshihiro Kondo, Chofu, Japan

[73] Assignees: Toshihiro Kondo, Chofu; Fuji Photo Film Co., Ltd., Minami-ashigara, both of Japan

[21] Appl. No.: 665,185

[22] Filed: Mar. 9, 1976

[30] Foreign Application Priority Data

Mar. 19, 1975 Japan .................................. 50-33194

[51] Int. Cl.$^2$ ............................................. G05D 25/00
[52] U.S. Cl. ...................................... 350/269; 335/303; 354/234
[58] Field of Search ........ 335/303; 354/226, 233–235, 354/245–255, 258, 266, 270–274; 352/204–219; 250/229, 237 R; 350/266–275

[56] References Cited
U.S. PATENT DOCUMENTS

| | | | |
|---|---|---|---|
| 3,205,569 | 9/1965 | Nerwin et al. | 354/271 X |
| 3,213,335 | 10/1965 | Bourne | 335/303 |
| 3,635,141 | 1/1972 | Starp et al. | 354/235 |

*Primary Examiner*—F. L. Evans

[57] ABSTRACT

A thin permanent magnet sheet is sealed in a plastic blade. The magnet sheet is provided with perforations for binding the plastic material on one side of the magnet sheet with the plastic material on the other side thereof, thereby reinforcing the blade and facilitating the manufacture thereof. The magnet sheet is further provided on both sides thereof with projections of equal height to facilitate the molding of the plastic blade with the magnet sheet sealed therein at the middle of the thickness thereof.

6 Claims, 7 Drawing Figures

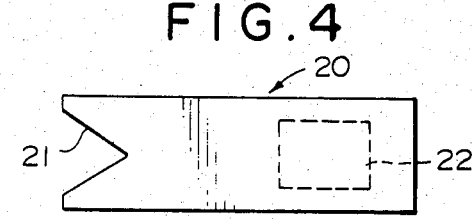
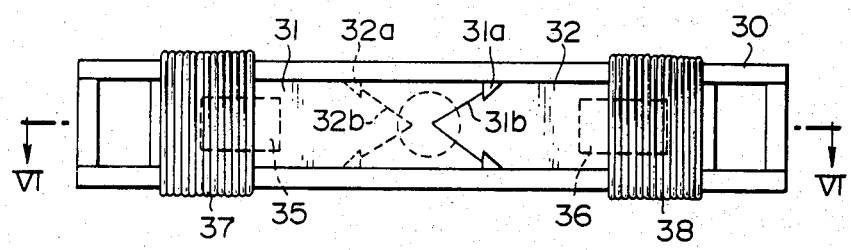
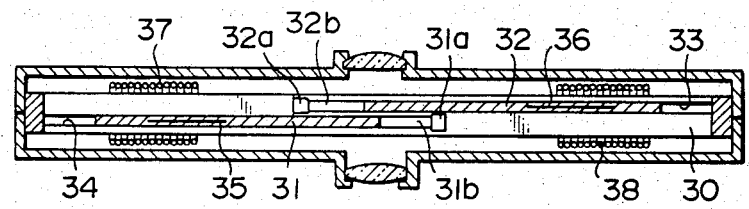
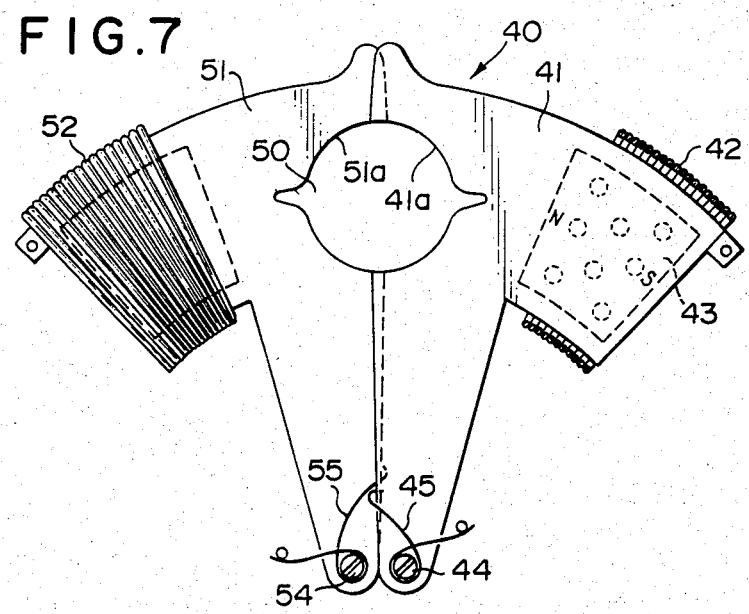

ELECTROMAGNETICALLY DRIVEN OPTICAL BLADE

BACKGROUND OF THE INVENTION

1. Field of the Invention

This invention relates to an optical blade such as a shutter blade or a diaphragm blade for intercepting light rays in optical instruments such as photographic cameras, motion picture cameras, holographic cameras and the like, and more particularly to an optical blade which is driven to close or open a light passage in optical instruments by an electromagnetic force.

2. Description of the Prior Art

It has been desired to reduce the number of parts of a camera to reduce the weight and size thereof. By simplifying the structure of the camera, it is also possible to simplify the operation and lower the manufacturing cost thereof. From the viewpoint of simplification, it is undesirable to drive the various mechanisms in the camera only by mechanical driving means. Therefore, as a means for controlling the shutter mechanism and the diaphragm mechanism it has been proposed and put into practice an electric control means employing an exposure control circuit.

Even in these electrically controlled cameras, however, the control mechanisms are driven by a mechanical force as of a spring. For instance, a spring force is charged by an operation to set a shutter mechanism and locked by a lock member, and then, the lock member is released by means of a solenoid or the like which is controlled by an electric circuit. The shutter mechanism is then driven by the force of the charged spring. These cameras employing a spring force to drive the shutter mechanism or the like require a complicated mechanical driving means. Therefore, the structure and operation of these cameras are still complicated and accordingly the manufacturing cost is still high.

In view of the defects inherent in these cameras, it has been proposed to drive the shutter mechanism or diaphragm mechanism by an electromagnetic force by use of a combination of a permanent magnet and a coil. However, since the driving force of the coil depends upon the number of turns of the windings and the amount of electric current flowing therethrough, the number of turns must be increased to obtain a large driving force with cells which, being small enough to load in the limited space within the camera body, are necessarily of low power, an increase in the number of turns of the coil windings results in an increase in the size of the coil, which is in undesirable from the viewpoint of manufacture. Therefore, it is desired that the optical blade electromagnetically driven should have the minimum weight possible. Further, in a case where the shutter blade is to be driven at a great speed, the inertia of the blade is desired to be as small as possible. From this point of view also, the weight of the blade is desired to be as small as possible.

In addition, the conventional optical blade is usually made of metal sheet having the thickness of about 0.04mm and bearing a black mat coating to prevent surface reflection. Such a metal blade has a defect in that the surface coating is apt to be scratched by the sharp edge of an adjacent blade particularly when the blade is used in a diaphragm comprising a number of diaphragm blades. The coating material scratched off falls on the surface of lenses in the camera and degrades the quality of the image. Further, the work of coating the surface of the blade with the black mat material is quite troublesome since the thickness of the blade is as small as several tens of microns. Besides, the metal blade has a large weight since the specific gravity of the metal used for the blade is as large as 7.0. Therefore, the metal blade is not suitable for electromagnetic driving.

SUMMARY OF THE INVENTION

The present invention is directed to an optical blade member such as a shutter blade or a diaphragm blade which is electromagnetically driven by an electromagnetic force.

It is an object of the present invention to provide an electromagnetically driven optical blade of small weight to be easily driven by an electromagnetic force.

It is another object of the present invention to provide an electromagnetically driven optical blade which can be manufactured at a low cost.

It is still another object of the present invention to provide an electromagnetically driven optical blade which is provided with a permanent magnet to be driven by a fixedly provided electromagnetic coil and which accordingly does not have lead wires.

It is a further object of the present invention to provide a plastic light intercepting blade such as a shutter blade or a diaphragm blade for cameras which is electromagnetically driven.

The optical blade in accordance with the present invention is characterized in that a thin permanent magnet sheet is provided in a plastic blade containing black pigments for making the blade impervious to light. The thin permanent magnet sheet is sealed in a light impervious plastic blade so that the magnet sheet is located at the middle of the thickness of the plastic blade. Therefore, the optical blade in accordance with the present invention does not have sharp edges, and accordingly, there is no fear of scratching the surface of other blades.

The optical blade in accordance with the present invention is further characterized in that the thin permanent magnet sheet has perforations to allow the plastic material on one side of the blade to be bound with the plastic material on the other side thereof, thereby facilitating the sealing of the magnetic sheet in the plastic blade and enforcing the plastic blade. The mechanical strength of the blade is enhanced by the binding of the plastic material on one side of the magnet sheet with the plastic material on the other side of the magnet sheet.

The optical blade in accordance with a preferred embodiment of the present invention is characterized in that the magnet sheet is provided on both surfaces thereof with a number of projections of equal height to facilitate the sealing of the magnet sheet in the plastic blade at the middle of the thickness thereof.

BRIEF DESCRIPTION OF THE DRAWING

FIG. 4 is a plan view of an optical blade in accordance with another embodiment of the present invention, FIG. 5 is a plan view showing an example of a shutter for a camera employing the optical blade as shown in FIG. 4, FIG. 6 is a longitudinal sectional view of the shutter as shown in FIG. 5 taken along the line VI—VI thereof, and FIG. 7 is a plan view showing an example of an electromagnetically driven diaphragm employing still another embodiment of the optical blade of the present invention.

DESCRIPTION OF THE PREFERRED EMBODIMENTS

Figure 1:
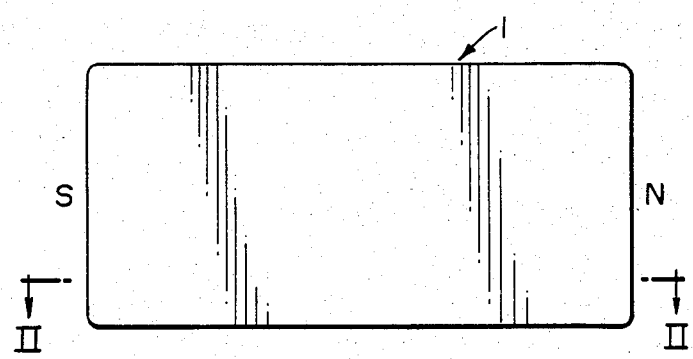
FIG. 1 is a plan view of an optical blade in accordance with an embodiment of the present invention.
Figure 2:
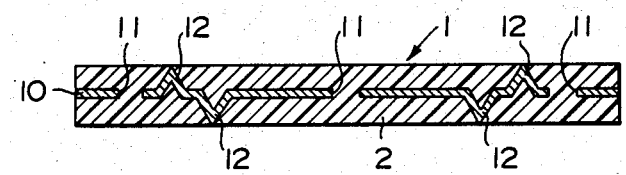
FIG. 2 is a sectional view of the optical blade as shown in FIG. 1 taken along the line II—II thereof.

An embodiment of the optical blade in accordance with the present invention is illustrated in FIGS. 1 and 2. The optical blade 1 has a rectangular shape and is used as a leading or trailing shutter blade of a focal plane shutter. The optical blade 1 has a permanent magnet sheet 10 sealed in the middle of the thickness of a plastic sheet 2. The permanent magnet sheet 10 has a thickness of 0.1 to 0.2mm.

The permanent magnet 10 has a number of perforations 11 and projections 12 of equal height. Through the perforations 11, the plastic material on one side of the magnet sheet 10 is bound with the plastic material on the other side thereof to firmly hold the magnet sheet 10 in the plastic sheet 2 and reinforce the blade 1. In addition, by the provision of the perforations 11, the overall weight of the blade 1 is reduced. The projections 12 are provided on both sides of the magnet sheet 10 to serve as spacers to locate the magnet sheet 12 at the middle of the thickness of plastic sheet 2 when the plastic blade 1 is molded together with the magnet sheet 10. Since the height of all the projections 12 is the same, the magnet sheet 10 is accurately located at the middle of the thickness of the plastic sheet 2. Therefore, warping of the plastic sheet 2 by temperature variation owing to the difference in thickness of the plastic material on one side of the magnet sheet 10 and that on the other side is prevented.

The plastic sheet 2 is made of thermoplastic resins such as polyacetal, polycarbonate, polyester etc. containing black pigments such as carbon black, or thermosetting resins such as resol type phenolic resins, condensation resins of xylen and phenol, diallyl phthalate resins, epoxy resins, unsaturated polyester resins etc. containing black pigments such as carbon black. Further, since the blade is required to be somewhat rigid, fabric reinforcement material such as carbon fiber or hard rubber is incorporated in the plastic material as required.

Figure 3:
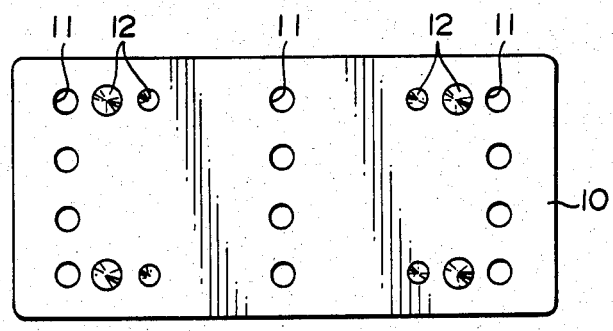
FIG. 3 is a plan view of the magnet sheet sealed in the optical blade as shown in FIGS. 1 and 2.

Although the perforations 11 and projections 12 are regularly arranged in the embodiment as shown in FIG. 3, these may be randomly arranged. Further, the shape of the perforations 11 and projections 12 is not limited to that shown in FIGS. 2 and 3.

In preparing the optical blade as described above, a polymer containing black pigments and fabric reinforcement therein can be molded together with a permanent magnet sheet punched into a desired shape located in the middle of the polymer by injection molding, or the magnet sheet can be laminated together with two plastic sheets interposing the magnet sheet therebetween. When the optical blade is used as a shutter blade or a diaphragm blade, the surface of the blade should preferably processed to have a rough surface to prevent surface reflection.

It is also possible to first form a large sheet of magnet having a number of perforations and interpose the magnet sheet between two thermoplastic sheets, and then heat the thermoplastic sheets to bind the thermoplastic sheet on one side of the magnet sheet with the thermoplastic sheet on the other side thereof through the perforations of the magnet sheet, and then cut the large plastic sheets having the magnet sheet interposed therebetween into several blades. In this case, the magnet sheet is exposed on the cut edge of the blade. In this specification, such a magnet sheet interposed between two sheets of plastic material is referred to as being "sealed".

An example of a shutter in which the blade in accordance with the present invention is employed will now be described in detail with reference to FIGS. 4 to 6. As shown in FIG. 4, a shutter blade 20 in accordance with this embodiment has a V-shaped cut-away portion at one end thereof and is provided with a permanent magnet sheet 22 sealed therein near the other end portion thereof. The permanent magnet sheet 22 is magnetized in the longitudinal direction. The structural details of the shutter blade 20 are the same as those shown in the aforesaid embodiment shown in FIGS. 1 to 3.

FIGS. 5 and 6 show an example of a guillotine shutter which employs the shutter blade as shown in FIG. 4. Two shutter blades 31 and 32 are slidably mounted in a shutter frame 30 to be guided along two guide grooves 33 and 34, respectively. The two shutter blades 31 and 32 are held in abutment with stoppers 31a and 32a by means of spring means (not shown) when the shutter is closed, as shown in FIG. 5. The first shutter blade 31 has sealed therein a permanent magnet 35 and the second shutter blade 32 has sealed therein a permanent magnet 36. A first coil 37 is stationarily provided around the first shutter blade 31 and a second coil 38 is stationarily provided around the second shutter blade 32. When the first coil 37 is energized, the first shutter blade 31 is moved to the left overcoming the force of the spring means by an electromagnetic force produced between the first coil 37 and the permanent magnet 35 carried in the first shutter blade 31. Similarly, when the second coil 38 is energized, the second shutter blade 32 is moved to the right. Thus, by energizing the coils 37 and 38, the shutter blades 31 and 32 are slid in the direction to open a light passage to expose a film in the camera. After the shutter is opened, the shutter blades 31 and 32 are closed by the force of the spring means upon deenergization of the coils 37 and 38. The shutter speed is controlled by controlling the time during which the coils 37 and 38 are energized. In order to obtain an extremely high shutter speed, the coils 37 and 38 are energized in the reverse direction when the shutter blades 31 and 32 are to be closed. In the above embodiment, it is possible to control the length of stroke of the shutter blades by use of a step cam or the like located in the way of the movement of the shutter blades, whereby the size of an aperture formed by the cut-away portions 31b and 32b of the shutter blades 31 and 32 is controlled.

Now, an electromagnetically driven diaphragm employing an embodiment of the present invention will be described in detail with reference to FIG. 7. In this embodiment, an electromagnetically driven diaphragm 40 comprises a first diaphragm blade 41 and a second diaphragm blade 51 having rounded cutaway portions 41a and 51a, respectively, to form a round aperture 50, and a first coil 42 stationarily provided around the first diaphragm blade 41 and a second coil 52 stationarily provided around the second diaphragm blade 51. The diaphragm blades 41 and 51 have sealed therein permanent magnets 43 and 53, respectively. The blades 41 and 51 are rotatably mounted on pivots 44 and 54 to vary the size of the aperture 50 formed by the cut-away portions 41a and 51a of the blades 41 and 51. The first diaphragm blade 41 is spring urged in the clockwise direction by means of a spring 45 and rotated in the couterclockwise direction by an electromagnetic force produced between the permanent magnet 43 and the first coil 42. Similarly, the second diaphragm blade 51 is spring urged counterclockwise by a spring 55 and rotated clockwise by the second coil 52. By energizing the coils 42 and 52, the diaphragm blades 41 and 51 are rotated to reduce the size of the aperture 50 overcoming the force of the springs 45 and 55. Where the electromagnetic repulsion force produced between the magnet and the coil is balanced with the force of the spring, the diaphragm blades stop. Since the electromagnetic force produced depends upon the amount of electric current flowing through the coils, the size of the aperture 50 can be controlled by controlling the amount of the electric current.

We claim:

1. An optical blade which is electromagnetically driven comprising an opaque plastic sheet member and a permanent magnet sheet sealed therein, said permanent magnet sheet extending in parallel to the plastic sheet member at the middle of the thickness of said plastic sheet member, said permanent magnet sheet being provided with a number of perforations through which the plastic material on one side of the magnet sheet is bound with the plastic material on the other side thereof.

2. An optical blade as defined in claim 1 wherein said permanent magnet is provided on both sides thereof with projections of equal height.

3. An optical blade as defined in claim 1 wherein said plastic sheet member comprises a plastic material and black pigment mixed therewith.

4. An optical blade as defined in claim 3 wherein said plastic material is thermoplastic resin.

5. An optical blade as defined in claim 3 wherein said plastic material is thermosetting resin.

6. An optical blade as defined in claim 3 wherein said black pigment is carbon black.